Nov. 30, 1948.  A. SCIANNA  2,455,097
ADJUSTABLE RADIAL KERFING SAW
Filed Sept. 2, 1944  3 Sheets-Sheet 2
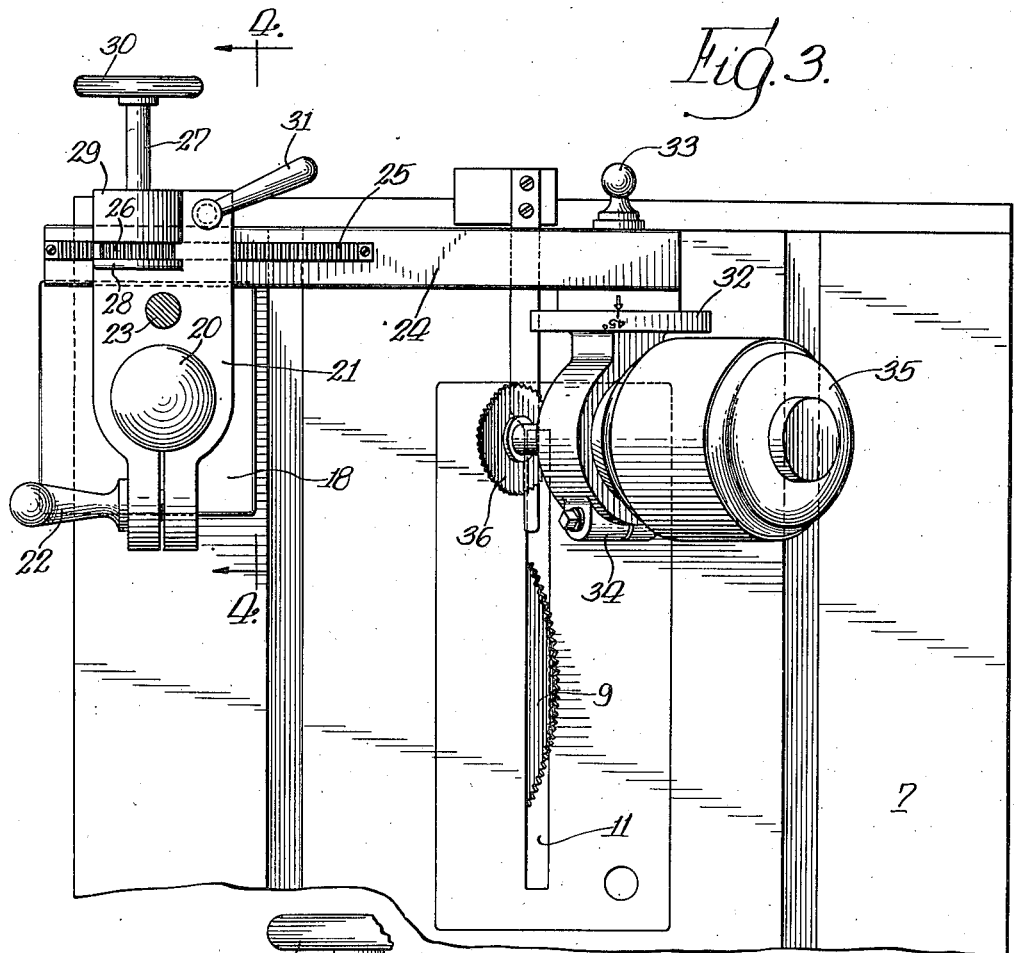
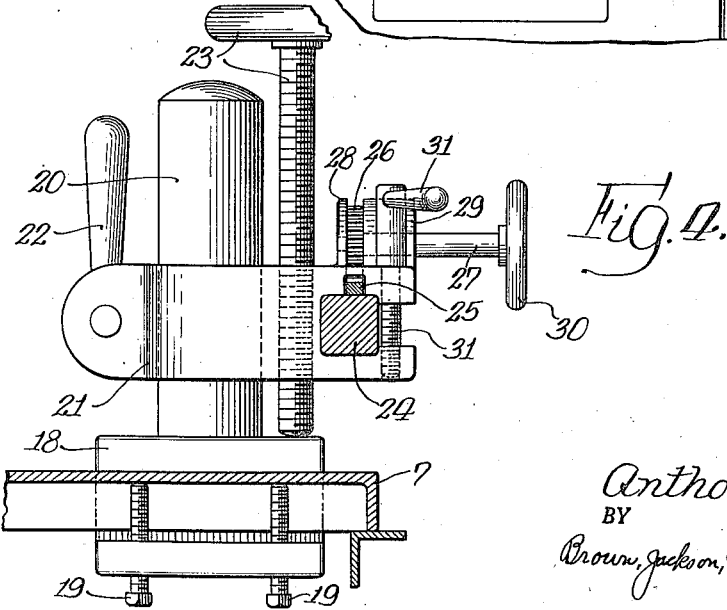
INVENTOR.
Anthony Scianna,
BY
Brown, Jackson, Boettcher Dienner
Attys.

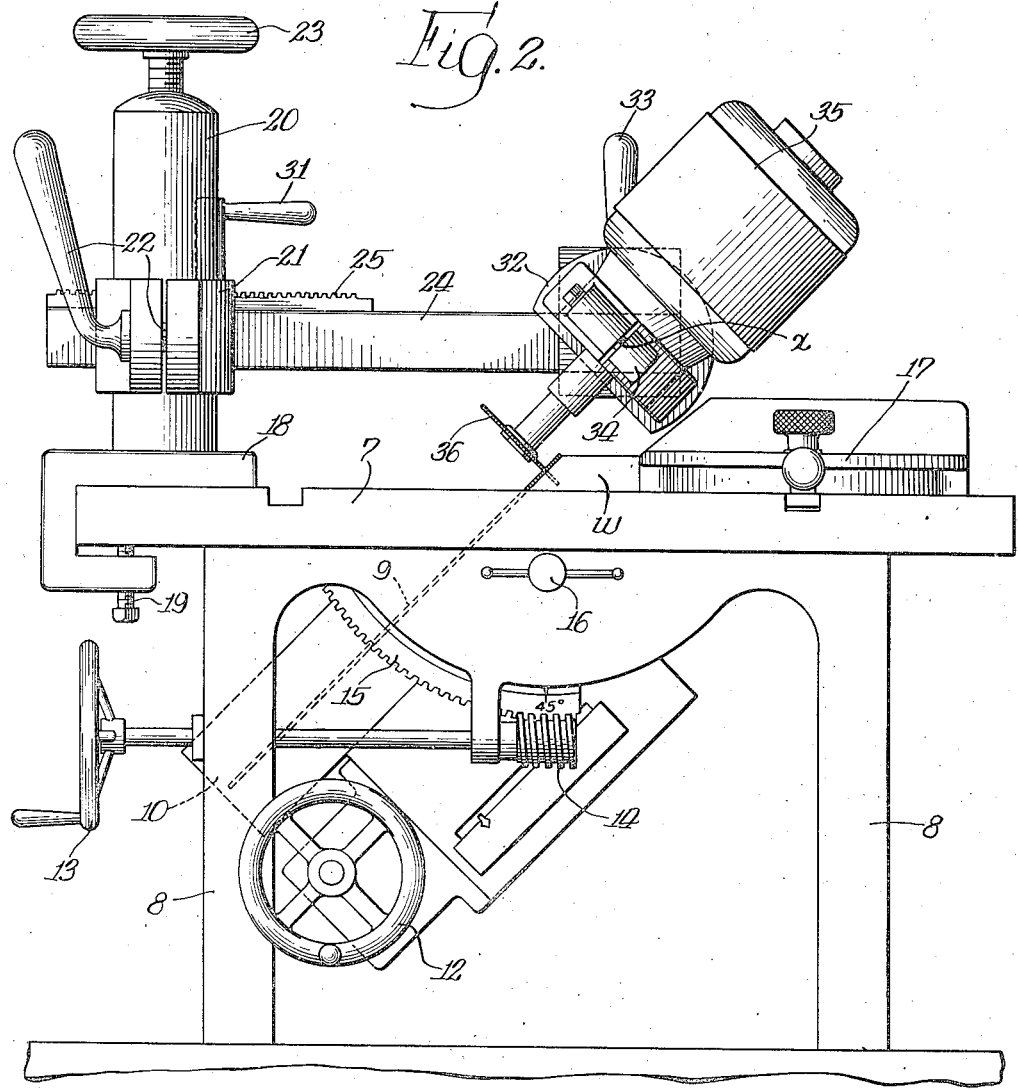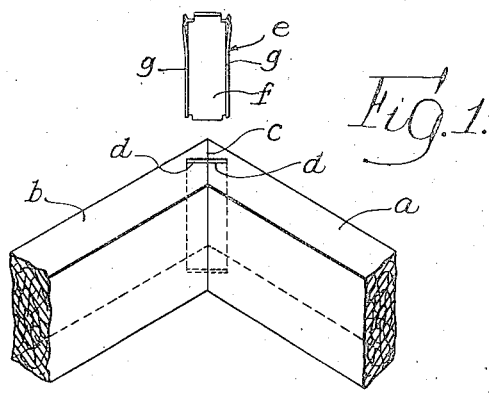

Nov. 30, 1948.  A. SCIANNA  2,455,097
ADJUSTABLE RADIAL KERFING SAW
Filed Sept. 2, 1944  3 Sheets-Sheet 3
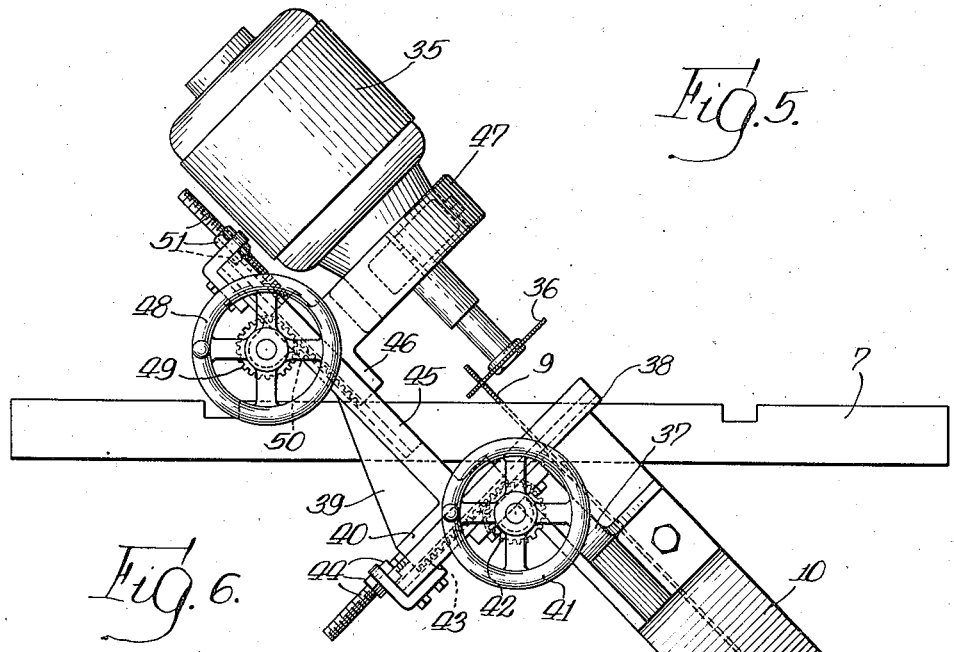
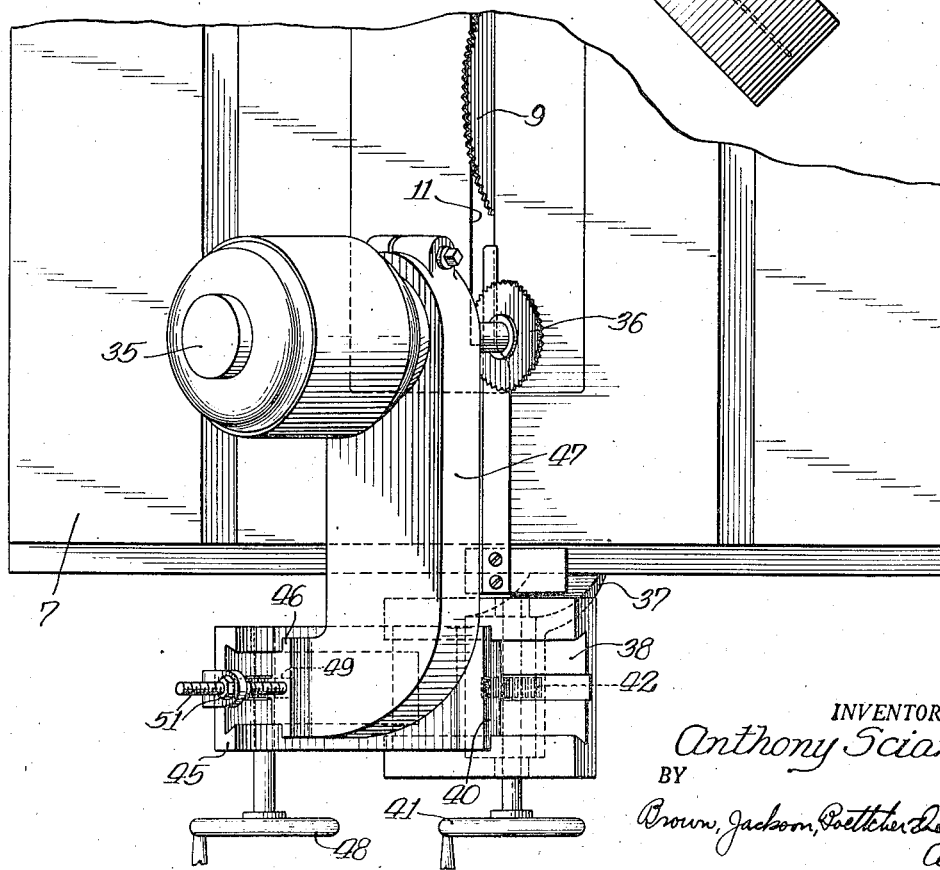
INVENTOR.
Anthony Scianna,
BY
Brown, Jackson, Boettcher & Dienner
Atty's.

Patented Nov. 30, 1948

2,455,097

UNITED STATES PATENT OFFICE 2,455,097

ADJUSTABLE RADIAL KERFING SAW

Anthony Scianna, Chicago, Ill., assignor to Clamp Nail Company, Chicago, Ill., a corporation of Illinois Application September 2, 1944, Serial No. 552,470

1 Claim. (Cl. 143—6)

My invention relates to power tools, and is particularly concerned with sawing equipment for use in joinery.

The purpose of my invention is to facilitate the sawing, in woodwork at the joint surfaces, of kerfs for the reception of what are known in the industry as "clamp nails," these clamp nails having a web, to lie in the alined and juxtaposed kerfs in two pieces to be joined, and right angled flanges to bite into the wood.

My invention is illustrated in the accompanying drawings in which—

Figure 1 illustrates a clamp-nail joint of the type with which my invention is concerned;

Figure 2 is an elevational view of sawing equipment embodying my invention;

Figure 3 is a plan view thereof;

Figure 4 is a vertical sectional view taken on the plane of the line 4—4 of Figure 3 and looking in the direction indicated by the arrows;

Figure 5 is an elevational view illustrating a modification; and

Figure 6 is a plan view of the arrangement illustrated in Figure 5.

Figure 1 illustrates, for example, a forty-five degree miter joining of two strips of wood *a* and *b*, the juxtaposed surfaces being indicated at *c*. In each piece *a* and *b*, at the joint surface, a kerf *d*, normal to the surface *c* is sawed, and, when the two pieces are put together as illustrated, the alined kerfs *d*, *d*, are ready for the reception of the clamp nail *e*, which is of I cross-section, comprising the web *f*, adapted to enter the kerfs *d*, *d*, and the flanges *g*, *g*, which are adapted to bite into the wood at the kerf bottoms, thus firmly to hold the two pieces *a* and *b* together.

My invention is concerned with the sawing of the kerfs *d*, *d*, which I accomplish as an immeiate adjunct to the sawing of the pieces to be joined to form the joined surfaces.

Referring now to Figures 2 and 3;

It will be seen that, firstly, I illustrate a more-or-less conventional circular saw, comprising the saw table 7, mounted upon the leg-frame 8, and the motor-driven circular saw itself, 9, mounted in an adjustable framework 10, which saw extends through the slot 11 in the table 7.

This entire framework, carrying the motor-driven saw, can be raised and lowered by turning the hand wheel 12, and is also hung upon trunnions, so that the saw 9 may be swung into any selected angular position, by means of the hand wheel 13, through the medium of the worm 14 and gear 15. A clamp 16 locks the framework in adjusted position. On top of the table 7 there is mounted the gauge 17, which is slidable back and forth and against which the stock is carried as it is passed into contact with the saw.

That which has thus been described is, as indicated, a more or less conventional and well known saw equipment, and it is therefore not shown in any greater detail.

My invention, in its first form, involves the mounting of the kerfing saw as an attachment to the more-or-less standard table 7, and I shall now describe that attachment by referring to the same figures, and also additional Figure 4.

A C-clamp 18 is applied to the table 7, as illustrated, being held in position by means of set screws 19. This C-clamp is provided with the upwardly extending tool post 20 which is embraced by the supporting clamp 21, held on the tool post 20, at any selected vertical position, by means of the hand clamp 22, 22. This supporting clamp 21 is moved vertically by means of the hand screw 23, which engages the C-clamp 18, as illustrated in Figure 4, and it is clear that, after being moved to the desired vertical position by means of the hand screw 23, the supporting clamp may be locked in position by means of the hand clamp 22.

A supporting bar 24 is mounted crosswise in the supporting clamp 21, i. e. in direction to extend toward the plane of action of the saw 9. As best shown in Figure 4, this supporting bar 24 is mounted in a slot in the clamp 21, and it is provided, on its top, with a rack 25, to be engaged by a pinion 26 mounted on shaft 27 in the bearing members 28 and 29 on the top of the clamp, the shaft 27 being provided with the hand wheel 30. As the hand wheel 30 is turned in one direction or the other, the supporting bar 24 is moved outwardly and inwardly toward and away from the plane of action of the saw 9, and it may be held in any adjusted position by means of the hand clamp 31.

At its outer end, the supporting bar 24 is provided with a supporting bracket 32 mounted for angular adjustment on the axis *x* and held to the supporting bar, and in adjusted position, by the hand clamp 33. This supporting bracket 32 is of the split ring type, as indicated at 34, and it supports the kerf saw motor 35, and the kerf saw 36 mounted on the armature shaft thereof, the axis of this armature shaft intersecting the axis *x*, as will be clear from Figure 2.

The means for supporting the kerf saw motor is offset rearwardly from the vertical plane of the axis of the main saw 9, and, as best shown in Figure 3, the arrangement is thus such that after the work is passed against the main saw 9, the same movement, continued, passes it into engagement with the kerf saw 36. Viewing this arrangement in elevation, as in Figure 2, it will be seen that the plane of the saw 36 is normal to the plane of the saw 9, it being usual to make the kerfs normal to the joined surfaces, as indicated in Figure 1. In Figure 2 the work, indicated at w, is being sawed for a forty-five degree miter joint, and, accordingly, the axis of the kerf saw shaft is set at forty-five degrees. As the artisan moves the work, on the saw table 7, from front to back, held in engagement with the gauge 17, it first encounters the main saw 9, whereby the miter cut is accomplished, and then, as the same movement is continued, the kerf is sawed by the saw 36 which has previously been placed in the proper position by adjusting the motor 35 angularly upon the supporting bar 24, by adjusting the bar 24 appropriately in the supporting clamp 21, and by adjusting the clamp 21 appropriately on the tool post 20. Obviously, in whichever way the saw 9 has been adjusted by means of the hand wheels 12 and 13, the saw 36 can be adjusted to cut the kerf just where it should be cut in the surface cut by the saw 9.

In Figures 5 and 6 I have illustrated a modification whereby the kerf saw 36 is always at right angles to the main saw 9, regardless of the selected position of the main saw 9, without further attention of the operator.

In these figures, the kerf saw and its motor, instead of being mounted for angular adjustability on the saw table, is mounted without angular adjustability on the framework which carries the main saw 9. Thus, in whichever position the main saw 9 is disposed, the kerf saw 36 is always at right angles to it.

The saw table, the main circular saw, the circular kerf saw, and the kerf saw motor are supplied with the same reference characters with which these elements are supplied in the other figures. Extending laterally, and then upwardly, from the swinging framework in which the saw 9 is carried, is a bracket 37 which, in turn, carries a dovetail slide 38 beyond the rear edge of the saw table. A bracket 39 has a base 40 which is movable in the dovetail slide 38, by means of a hand wheel 41, through the intervention of a pinion 42 and rack 43. By turning the hand wheel 41 the bracket 39 may be moved back or forth to adjusted position, wherein it may be held by means of the locking screw and nuts 44. The upright portion 45 of the bracket 39 is also in the form of a slide, in which the base 46 of a forwardly extending bracket 47 is mounted and in which it may be moved up or down by means of the hand wheel 48, through the intervention of pinion 49 and rack 50, this bracket being held in any adjusted position by means of the locking screw and nuts 51. The bracket 47 carries the kerf saw motor 35 and the kerf saw 36.

It will be seen that by means of the hand wheel 41 the kerf saw 36 may be moved toward and away from the plane of the saw 9, and that, by means of the hand wheel 48, it may be moved toward and away from the axis of the saw 9. Whatever these adjusted positions, as already indicated, the saw 36 is always at right angles to the saw 9. The use of the machine is precisely the same as that described in reference to the equipment shown in Figures 2, 3 and 4.

It is also possible to mount the circular kerf saw from below the saw table by slotting the latter, in which case the kerf saw motor can be located below the saw table and indeed one motor used to operate both saws.

I claim:

An accessory for a circular saw machine, comprising a clamp for securing to the saw table, a vertical tool post on said clamp, a supporting clamp mounted on said tool post and vertically adjustable thereon, a hand screw threaded in said supporting clamp and engaging said first-named clamp for raising and lowering said supporting clamp on said tool post, a hand clamp for locking said supporting clamp in adjusted position on said tool post, said supporting clamp having a transverse opening therein, a supporting bar mounted in said opening, rack and pinion mechanism for moving said supporting bar to adjusted position in said supporting clamp, a hand clamp for locking said supporting bar in fixed position in said supporting clamp, a supporting member at the free end of said supporting bar, said supporting member being mounted on said supporting bar on an axis for angular adjustment, means for locking said supporting member in adjusted position on said supporting bar, an electric motor mounted in said supporting member, and a circular saw mounted on the armature shaft of said electric motor.

ANTHONY SCIANNA.

REFERENCES CITED

The following references are of record in the file of this patent:

UNITED STATES PATENTS

| Number | Name | Date |
|---|---|---|
| 160,838 | Norton | Mar. 16, 1875 |
| 722,197 | Schneider | Mar. 3, 1903 |
| 1,828,043 | Hedgpeth | Oct. 20, 1931 |
| 1,839,378 | Dannehower | Jan. 5, 1932 |
| 1,846,641 | Hedgpeth | Feb. 23, 1932 |
| 1,850,773 | Rueger | Mar. 22, 1932 |
| 2,265,407 | Tautz | Dec. 9, 1941 |
| 2,347,374 | Stahler | Apr. 25, 1944 |

FOREIGN PATENTS

| Number | Country | Date |
|---|---|---|
| 16,976 | Great Britain | Dec. 9, 1887 |